(12) United States Patent
DeMesa et al.

(10) Patent No.: US 8,566,781 B2
(45) Date of Patent: Oct. 22, 2013

(54) MODEL-BASED VIEW PARTS AND REUSABLE DATA SOURCE CONFIGURATIONS

(75) Inventors: Jesse DeMesa, Lake Forest, CA (US); Stephen Sjolander, Laguna Niguel, CA (US); Thomas Ngoc Nguyen, Westminster, CA (US); James Eric O'Hearn, Mission Viejo, CA (US)

(73) Assignee: Siemens Aktiengesellschaft, Munich (DE)

( * ) Notice: Subject to any disclaimer, the term of this patent is extended or adjusted under 35 U.S.C. 154(b) by 1397 days.

(21) Appl. No.: 12/105,098

(22) Filed: Apr. 17, 2008

(65) Prior Publication Data
US 2008/0263514 A1    Oct. 23, 2008

Related U.S. Application Data

(60) Provisional application No. 60/926,069, filed on Apr. 23, 2007.

(51) Int. Cl.
G06F 9/44 (2006.01)

(52) U.S. Cl.
USPC ............ 717/104; 717/109; 717/121; 715/762

(58) Field of Classification Search
USPC ................... 717/105–109; 715/762; 370/396
See application file for complete search history.

(56) References Cited

U.S. PATENT DOCUMENTS

| | | | |
|---|---|---|---|
| 5,764,226 A * | 6/1998 | Consolatti et al. ............ | 715/747 |
| 6,700,590 B1 | 3/2004 | DeMesa et al. | |
| 6,968,538 B2 * | 11/2005 | Rust et al. ..................... | 717/108 |
| 7,043,692 B2 * | 5/2006 | Yu ................................. | 715/762 |
| 7,376,904 B2 * | 5/2008 | Cifra et al. .................... | 715/763 |
| 7,392,483 B2 * | 6/2008 | Wong et al. ................... | 715/746 |
| 7,506,273 B2 * | 3/2009 | Lahiri ........................... | 715/854 |
| 7,577,938 B2 * | 8/2009 | Bent et al. ..................... | 717/113 |
| 7,607,095 B2 * | 10/2009 | Marcos et al. ................ | 715/744 |
| 7,653,880 B2 * | 1/2010 | Peters et al. .................. | 715/762 |
| 7,707,550 B2 * | 4/2010 | Resnick et al. ............... | 717/121 |
| 7,865,844 B2 * | 1/2011 | Lahiri ........................... | 715/854 |

(Continued)

OTHER PUBLICATIONS

Sandy Minocha, IBM WebShere Developer Technical Journal: Binding Swing visual components to data with the Rational Application Developer Visual Editor, May 11, 2005, www.ibm.com/developerworks/websphere/techjournal/0505, XP-002489043.

(Continued)

*Primary Examiner* — Lewis A Bullock, Jr.
*Assistant Examiner* — Francisco Aponte
(74) *Attorney, Agent, or Firm* — Laurence A. Greenberg; Werner H. Stemer; Ralph E. Locher

(57) ABSTRACT

A first widget of a first view part associated with a component of a class model and with one or more members of the component, and a second widget of a second view part associated with the component of the class model and with the one or more members of the component are defined. A request for data associated with a first object instantiation of the component to populate the first widget is received, and a configuration is identified based on the first widget, the configuration specifying a data source, a data source interface, input parameters, and a mapping to one or more of the one or more members of the component.

20 Claims, 11 Drawing Sheets

(56) References Cited

U.S. PATENT DOCUMENTS

| | | | |
|---|---|---|---|
| 2003/0145305 A1* | 7/2003 | Ruggier | 717/100 |
| 2003/0160822 A1* | 8/2003 | Belz et al. | 345/762 |
| 2004/0153992 A1* | 8/2004 | Molina-Moreno et al. | 717/105 |
| 2005/0010877 A1* | 1/2005 | Udler | 715/826 |
| 2005/0010901 A1* | 1/2005 | Udler | 717/109 |
| 2005/0091670 A1* | 4/2005 | Karatal et al. | 719/328 |
| 2005/0144154 A1 | 6/2005 | DeMesa et al. | |
| 2005/0188349 A1* | 8/2005 | Bent et al. | 717/106 |
| 2006/0031250 A1* | 2/2006 | Henigman et al. | 707/103 R |
| 2006/0067334 A1* | 3/2006 | Ougarov et al. | 370/396 |
| 2006/0168536 A1* | 7/2006 | Portmann | 715/762 |
| 2006/0206890 A1* | 9/2006 | Shenfield et al. | 717/174 |
| 2006/0236254 A1* | 10/2006 | Mateescu et al. | 715/762 |
| 2006/0259870 A1* | 11/2006 | Hewitt et al. | 715/762 |
| 2006/0271908 A1* | 11/2006 | Bargh et al. | 717/100 |
| 2007/0073763 A1 | 3/2007 | Betts et al. | |
| 2007/0234195 A1* | 10/2007 | Wells | 715/501.1 |
| 2008/0016466 A1* | 1/2008 | Grasser et al. | 715/835 |
| 2008/0059504 A1* | 3/2008 | Barbetta et al. | 707/102 |
| 2008/0097906 A1* | 4/2008 | Williams et al. | 705/44 |
| 2008/0163078 A1* | 7/2008 | Van Der Sanden et al. | 715/762 |
| 2008/0222232 A1* | 9/2008 | Allen et al. | 709/201 |

OTHER PUBLICATIONS

Struts User's Guide, $Id:users_guide.html,v 1.12 Jan. 10, 2001 07:35:18 craigmcc Exp$, XP-002265497.

The Enterprise Objects Framework, 1993-94 NeXT Computer, Inc., XP002047858.

* cited by examiner

MODEL-BASED VIEW PARTS AND REUSABLE DATA SOURCE CONFIGURATIONS

CROSS REFERENCE TO RELATED APPLICATIONS

This application claims priority to Provisional Application Ser. No. 60/926,069, filed Apr. 23, 2007 and entitled "Model-Based View Parts with Reusable Data Source Configurations", the contents of which are incorporated herein in their entirety and for all purposes.

BACKGROUND

1. Field

The embodiments described below relate generally to systems for graphically presenting data using a class-based model.

2. Discussion

Conventional business software applications may allow end users to develop customized graphical interfaces for viewing business data. An end user may select the data to be viewed and a graphical layout for presenting the selected data. In some systems, an end user may also associate role-based logic with a graphical interface. As a result, the particular data viewed and/or the graphical layout may depend upon a role of the viewer.

User-developed interfaces include bindings to the specific data to be displayed thereby. These bindings may include data filters, ordering clauses, grouping/data aggregation definitions, and other aspects typically associated with structured query language (SQL) functionality. Although the bindings may be transparent to the user during interface development, the bindings limit reuse of the interfaces in other scenarios and/or with other data sources.

Some prior systems attempt to promote reusable interfaces by facilitating editing of the above-described bindings or other technical information needed to provide a graphical interface. Such systems may provide "wizards" to step users through configuration sequences along with anticipated guidance and help information. The above approach is limited to simple technical changes and, even for simple changes, might not provide the desired result.

Systems are needed which may more efficiently provide for the development of reusable interfaces.

SUMMARY

In order to address the foregoing, some embodiments concern a system, a method, an apparatus, a medium storing processor-executable process steps, and means to define a first widget of a first view part associated with a component of a class model and with one or more members of the component, and define a second widget of a second view part associated with the component of the class model and with the one or more members of the component. A request for data associated with a first object instantiation of the component to populate the first widget is received, and a configuration is identified based on the first widget, the configuration specifying a data source, a data source interface, input parameters, and a mapping to one or more of the one or more members of the component. The requested data is received based on the data source, the data source interface, the input parameters, and the mapping to one or more of the one or more members of the component, and the first widget is populated with the received data.

Further, a request for second data associated with a second object instantiation of the component to populate the second widget is received, the configuration is identified based on the second widget, the requested second data is received based on the data source, the data source interface, the input parameters, and the mapping to one or more of the one or more members of the component, and the second widget is populated with the second received data.

Some aspects include definition of a third widget of the first view part associated with the component of the class model and with the one or more members of the component, reception of a request for third data associated with a third object instantiation of the component to populate the third widget, identification of the configuration based on the third widget, reception of the requested third data based on the data source, the data source interface, the input parameters, and the mapping to one or more of the one or more members of the component, and population of the third widget with the received third data.

In other aspects, a third widget of the first view part associated with the component of the class model and with a second one or more members of the component is defined, a request for third data associated with a third object instantiation of the component to populate the third widget is received, a second configuration is identified based on the third widget. The second configuration specifies a second data source, a second data source interface, second input parameters, and a second mapping to one or more of the second one or more members of the component. The requested third data is received based on the second data source, the second data source interface, the second input parameters, and the second mapping, and the third widget is populated with the received third data.

Further to the foregoing aspect, a fourth widget of the first view part associated with the component of the class model and with the one or more members of the component may be defined, a request for fourth data associated with a fourth object instantiation of the component to populate the fourth widget may be received; the configuration based on the fourth widget, the requested fourth data may be received based on the data source, the data source interface, the input parameters, and the mapping to one or more of the one or more members of the component, and the fourth widget may be populated with the received fourth data.

According to some embodiments, a third widget of the first view part associated with the component of the class model and with a second one or more members of the component is defined, a request for third data associated with a third object instantiation of the component to populate the third widget is received, a second configuration is identified based on the third widget, the second configuration specifying the data source, a second data source interface, second input parameters, and a second mapping to one or more of the second one or more members of the component, the requested third data is received based on the data source, the second data source interface, the second input parameters, and the second mapping, and the third widget is populated with the received third data.

The appended claims are not limited to the disclosed embodiments, however, as those in the art can readily adapt the teachings herein to create other embodiments and applications.

BRIEF DESCRIPTION OF THE DRAWINGS

The construction and usage of embodiments will become readily apparent from consideration of the following specification as illustrated in the accompanying drawings, in which like reference numerals designate like parts, and wherein.

DETAILED DESCRIPTION OF SPECIFIC EMBODIMENTS

Figure 1:
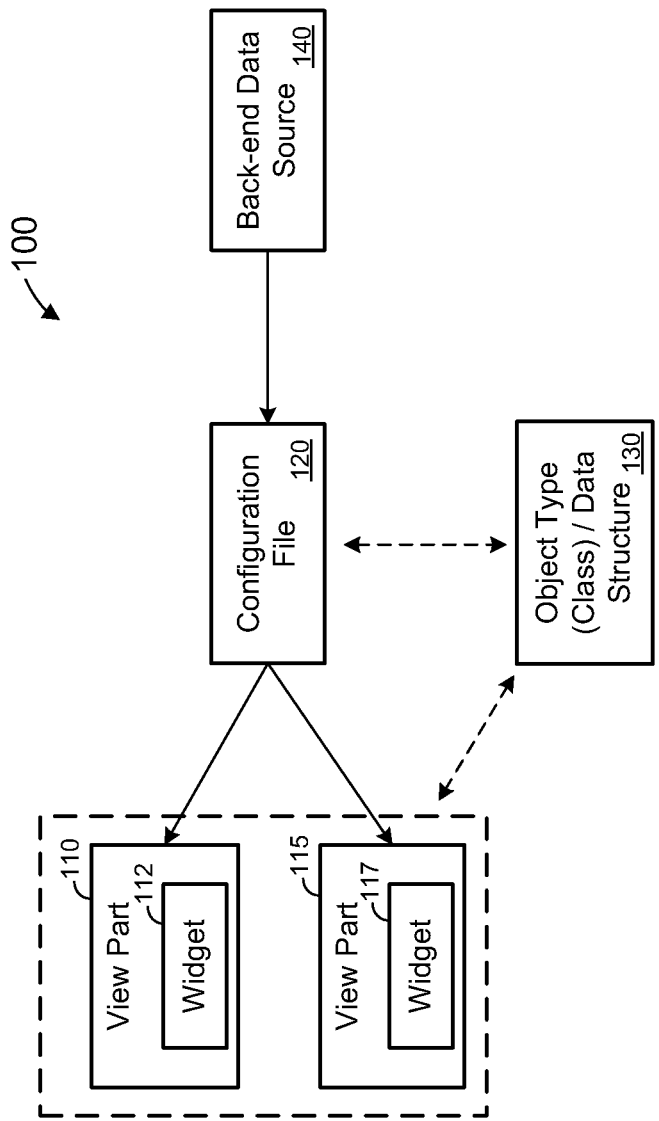
FIG. 1 is a block diagram illustrating relationships between view parts, a configuration file, a model-based data structure, and a back-end data source according to some embodiments.

FIG. 1 is a block diagram of system 100 according to some embodiments. Other architectures may be used in conjunction with other embodiments. System 100 includes view parts 110 and 115, configuration file 120, data structure 130 and back-end data source 140. In some embodiments, system 100 may be retrieve and view real and/or near-real time operations data arising from the operation of an industrial plant and stored in data source 140 based on a component model.

A "view part", as used herein, is a logical definition of presentation content which is to be displayed to users and may be role-based. A view part may therefore lack programming details, data binding or network connection details, or programming logic. A view part may be a subset of a Web page to appear in a browser window. A "view" comprises an entire page of information including zero (i.e., if the page includes only widgets, described below) or more view parts. View parts may be reusable within other view parts or views to create pages containing information relevant to a user's business decisions and/or role.

View parts 110 and 115 include graphical widgets 112 and 117, respectively. Examples of widgets include, but are not limited to, pull-down menus, context menus, tables, and graphs. Various systems to graphically create view parts including widgets are known, but such systems suffer from difficulties such as those described in the present Background.

Configuration file 120 generally provides a connection for populating widgets 112 and 117 with data from back-end data source 140. According to some embodiments, configuration file 120 includes several configurations, each of which specifies a data source, a data source interface, input parameters to the data source interface, and a mapping. The mapping maps data fields returned by the data source interface to component members to be presented by one or more view parts.

Some embodiments allow two or more view parts to use a single configuration for retrieving data. Both view parts may be associated with a same component of a component model, even though the data required by each view part may differ. For example, view parts 110 and 115 may each be associated with object class 130, but may present data of different instantiations of class 130.

Data source 140 may comprise any source of any data that may receive queries and provide data based on the queries. Data source 140 may expose interfaces to facilitate data queries. Data of data source 140 may comprise any type of data in any type of data structure that is or becomes known. In some embodiments, data source 140 stores data in the form of objects instantiated based on components of a component model.

According to some embodiments, data source 140 comprises a back-end data environment employed in an industrial context. Data source 140 may therefore comprise many disparate hardware and software systems, some of which are not interoperational with one another. Data source 140 may comprise plant floor production systems, enterprise resource planning data systems, and any other data systems according to some embodiments. Data arising from data source 140 may be associated with any aspect of industrial operations, and may consist of point data and non-point data used to characterize, contextualize, or identify the point data and/or the source of the point data.

The illustrated elements of system 100 may comprise any number of hardware and/or software elements in communication with one another, some of which are located remote from each other. As used herein, systems "in communication" with one another are directly or indirectly capable of communicating over any number of different systems for transferring data, including but not limited to a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Figure 2:
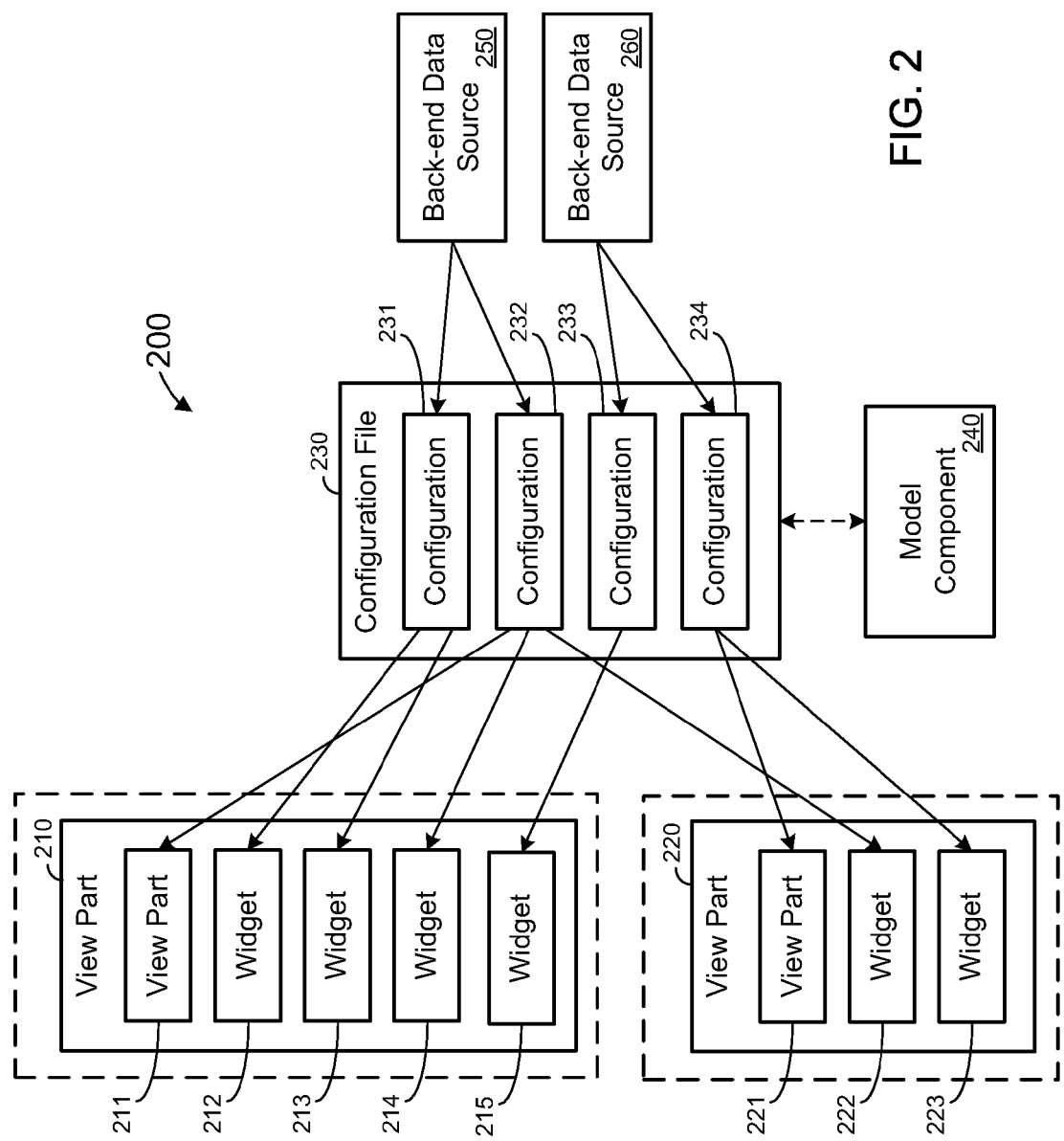
FIG. 2 is a block diagram illustrating relationships between view parts, widgets, configurations, a model-based data structure, and back-end data sources according to some embodiments.

FIG. 2 is a block diagram illustrating system 200 according to some embodiments. System 200 includes view parts 210 and 220, configuration file 230, data structure 240 and back-end data sources 250 and 260. System 200 illustrates various types of configuration reusability provided by some embodiments.

Each of view parts 210 and 220 is associated with model component 240, which may comprise an object class or other data structure. Accordingly, each of widgets 211 through 215 and widgets 221 through 223 is associated with one or more members of component 240. View part 210 includes view part 211 and view part 220 includes view part 221. Some embodiments therefore provide for nesting of view parts (and their associated widgets) within other view parts.

Configuration file 230 includes configurations 231 through 234. Configuration file 230 (and each of configurations 231 through 234) is associated with component 240. Each of configurations 231 through 234 is associated with any subset of the members of component 240. One of configurations 231 through 234 may be associated with the same members of component 240 as another one or more of configurations 231 through 234. Moreover, one of configurations 231 through 234 may be associated with a different one or more members of component 240 than another one or more of configurations 231 through 234.

Each of configurations 231 through 234 is associated with a data source, an interface of the data source, and input parameters of the data source interface. Each configuration is also associated with a mapping between data fields returned by its associated data source interface and members of component 240. In this regard, a widget may be intended to present data of particular component members of a particular instantiation of component 240 stored in a particular data source. Accordingly, the widget should be associated with one of configurations 231 through 234 which is associated with the particular data source and particular component members.

Turning to the particular associations illustrated in FIG. 2, configuration 231 is associated with back-end data source 250 and with each of widgets 212 and 213 of view part 210. Configuration 231 may therefore be used to populate widgets 212 and 213 with particular component member data of an instantiation of component 240 stored in data source 250.

Configuration 232 is associated with back-end data source 250, view part 211, widget 214 and widget 222. Accordingly, configuration 232 may populate view part 211, widget 214 and widget 222 with particular component member data of an instantiation of component 240 stored in data source 250. Again, the particular component instantiations may differ for each of view part 211, widget 214 and widget 222.

Although both are associated with back-end data source 250, configurations 231 and 232 may be associated with different subsets of the members of component 240. Configurations 231 and 232 may also or alternatively be associated with different interfaces of data source 250. Configurations 233 and 234 are both associated with back-end data source 260 and may therefore also be associated with different subsets of the members of component 240 and/or different interfaces of data source 260.

Configuration 233 is associated with widget 215 of view part 210, and configuration 234 is associated with view part 221 and widget 223 of view part 220. Each of configurations 233 and 234 may be used to populate view part 221 and widgets 215 and 223 with particular component member data of an instantiation of component 240 stored in data source 260. The particular members and/or component instantiations may differ depending on which of configurations 233 and 234 is used.

Figure 3:
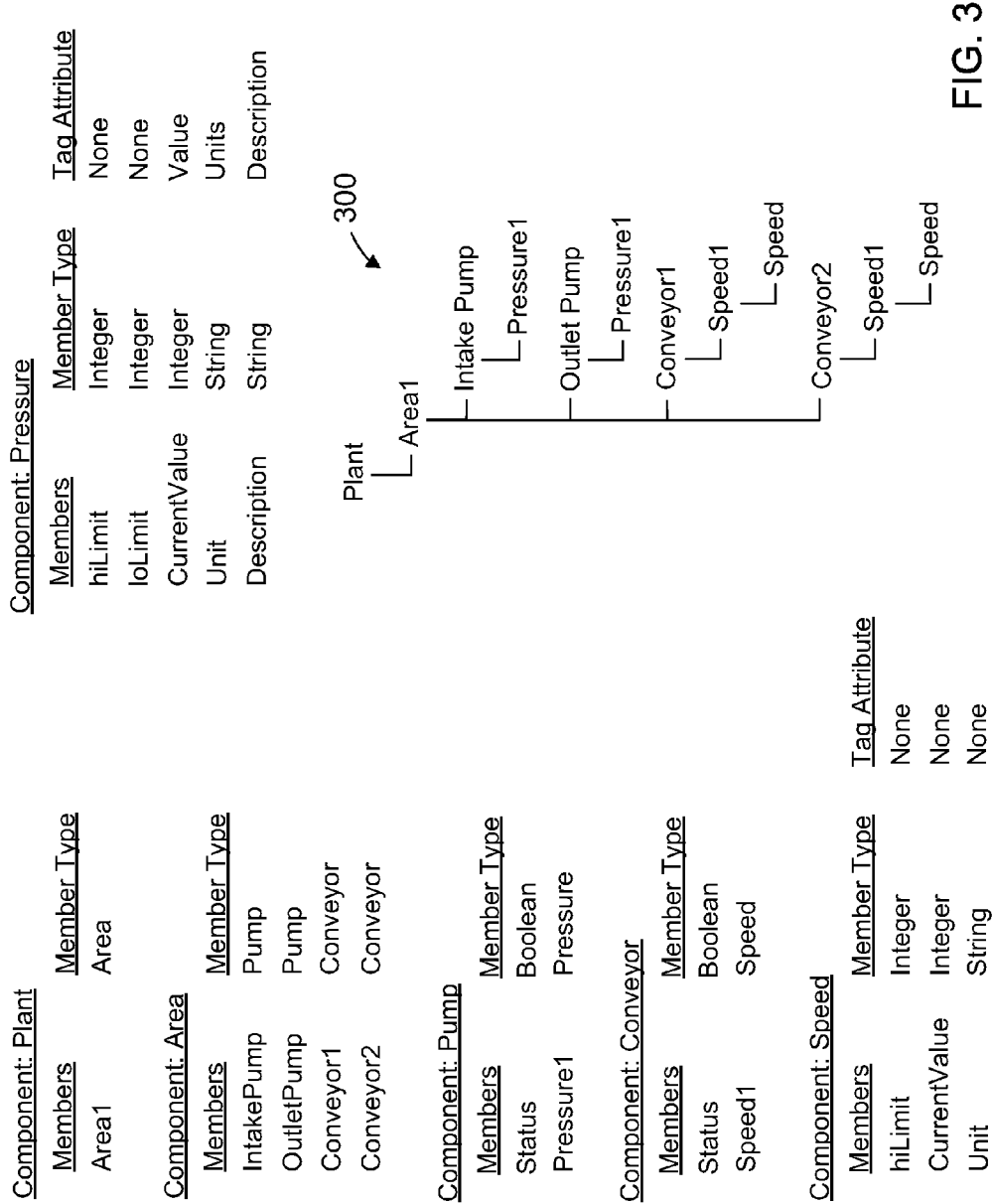
FIG. 3 is an illustration of a component model according to some embodiments.

FIG. 3 illustrates component model 300 according to some embodiments. Component 240 may comprise a component of component model 300 according to some embodiments. Component model 300 may represent tag-based data and non-tag-based data that are generated by a continuous industrial process.

In some embodiments, the tag-based data may be generated by and received from SCADA, HMI, DCS, plant historians, etc., and the non-tag-based data may be generated by and received from business systems and applications (e.g., SAP (ERP), Oracle Manufacturing Apps, general database apps, etc). Moreover, component model 300 may represent assets and geographies of a plant or manufacturing organization.

Commonly-assigned U.S. Pat. No. 6,700,590 describes a system to use a class-based object and view model to collect and display data received from multiple heterogeneous sources. This system encapsulates received tag-based data and non-tag-based data as objects, which are instantiations of defined components. The use of components and objects may provide reusability, consistency, inheritance and other benefits known to those familiar with object-oriented techniques.

Component model 300 may be established and utilized in any manner, including but not limited to those specified in aforementioned U.S. Pat. No. 6,700,590 and/or U.S. Patent Application Publication No. 2005/0144154, the contents of which are herein incorporated by reference for all purposes. Component model 300 may follow any suitable modeling protocol or format; including those mentioned in the foregoing references.

Each component of component model 300 includes at least one member, and each component member is associated with a member type. A member of a first component may be a second component, in which case the associated member type is the name of the second component. All members that are associated with "primitive" member types (which include anything other than another component) are either associated with a tag attribute or not (i.e. "None").

Component model 300 of FIG. 3 is shown in a tree or hierarchical format which facilitates visualization and understanding of the relationships and patterns of inheritance/instantiations for the various component definitions of FIG. 3. Component model 300 may therefore be displayed to an administrator or user according to some embodiments. In the illustrated embodiment, only components whose members are not associated with tag attributes are displayed in component model 300.

A component model may represent tag-based operations data and non-tag-based operations data that are generated by an industrial process. The operations data may represent any type of operation, including but not limited to batch processes, discrete processes, and/or continuous industrial processes employed in the oil industry (e.g., in an oil refinery), gas industry, and/or chemical industry.

Conventional industrial systems often rely to some extent on computer-based automation and monitoring. In some examples of automation and monitoring, data arising from the operation of a manufacturing plant is acquired, analyzed and responded to if necessary. The data may arise from independent sources, with each source configured to provide substantially raw or native "point" data at pre-defined intervals in real or near real-time. The point data may be presented to an operator in real or near-real time, and may include such as numerical values produced by gauges and/or monitors (e.g., speed, temperature, or pressure).

Examples of systems that may acquire, analyze, and act on point data include industrial automation systems, supervisory control and data acquisition (SCADA) systems, and general data acquisition systems. In such systems, point data may be associated with a "tag" to create a structural data element that is made accessible to other components, systems, applications and/or users. In general, point data obtained from selected sources is subject to dynamic change and is monitored and reported through various operations and functions associated with processing the point data. In industrial automation and control systems, decision support and reporting capabilities may be provided based on tag-associated point data that is monitored over very short timeframes ranging in the sub-second to sub-minute range.

Many conventional systems provide only limited capabilities to access, interpret, and/or manipulate tag-based point data collectively or in connection with "non-point" data. Non-point data relates to a broad category of context-providing information that is associated with point data and may extend the functionality and meaning of the point data. Non-point data may include descriptive and/or attribute information characterizing the point data, as well as, other information such as limits, ranges, etc. In conventional systems, integral and flexible manipulation of tag-based point data and non-point data is restricted due to the inherent differences between and properties of the two types of data.

Conventional systems also possess a limited ability to integrate and relate tag-based point data and non-tag-based data. Non-tag-based data may originate from numerous sources and relate to disparate aspects of an enterprise environment. For example, non-tag-based data may comprise data associated with conventional database applications/environments and include transactional information, production data, business data, etc. Conventionally, attempts to integrate non-tag-based data with tag-based point data may be hindered or prevented completely as a consequence of underlying differences in structure and content between these data types. As a result, generating and implementing logical constructions or schema in which both tag-based data and non-tag-based data are integrally used is problematic in conventional systems. Such limitations limit overall flexibility and increase the difficulty of scaling to complex, enterprise-level environments.

In this regard, the various embodiments described herein can be employed in a wide variety of industries and operational facilities. Any industrial process with differing types of operations data may supply data to systems utilizing the invention. For instance, facilities involved with natural resource refinement and procurement, oil and gas procurement, oil and gas refinement, chemical synthesis and refinement, water treatment, power generation, power transmission, food and beverage processing, raw materials processing (e.g. pulp, lumber, metals, and minerals), agricultural processing and materials processing (e.g. steel mills and foundries) may be suited to utilize platforms and software built upon concepts described herein. Additionally, facilities involved in finished goods manufacturing and production such as product assembly lines may utilize one or more embodiments or systems with such features.

These facilities may have various assets, equipment, machinery, flows etc. that produce operations data which may be continuous or discrete and may involve operations data that is presented in batches. Examples include pumps, motors, tanks, pipelines, mills, lathes, mixers, assembly lines, and so on. Operations data may include data from machinery, assets, process historians, maintenance systems, enterprise resource planning systems and the like. Examples of such data include pressure, temperature, capacities, volumes, rates of flow, production totals, inventories, performance indicators and the like.

"Operations data" as used herein includes tag-based point data, non-point data and non-tag-based data. As used herein, point data may be characterized as current, real-time, or value data associated with one or more instruments, components, or portions of a manufacturing, industrial, commercial, or other system. Any of these instruments, components, or portions may be configured to generate, measure, and/or sample point data of interest. For example, a data acquisition system for a particular instrument or machine may continuously or periodically acquire data reflecting a motor's operating speed and/or operating temperature as point data from a point data source associated with the motor. In certain instances, the point data may be a simple numerical or string value. Point data may further be associated with monitoring, control, and reporting functions of various instruments, components, and applications to provide information relating to the operation of a selected system. This information may also be made available for collection and review by various data acquisition and control systems.

Point data is often acquired in a raw or unstructured form wherein the point data reflects a numerical or string value without supporting details, description, and/or attributes. As previously described, certain types of point data may be associated with real-time or near real-time information (e.g. current temperature, pressure, speed, voltage, current, etc.) that may be desirably sampled, updated or refreshed relatively frequently. The exact frequency of these operations is typically dependent on the characteristics of the point data itself and may be different across the multiple point data sources incorporated into a particular system.

A tag may therefore represent a data structure comprising selected quanta of information associated with a particular point data informational source and may also comprise certain non-point data. In conventional systems, acquisition of each tag's current value (e.g. point data-associated information) generally requires a unique configuration for each tag and possibly for each tag's attributes (e.g. non-point data). Considering that it is not uncommon for complex industrial automation applications to contain upwards of 100,000 tags, it will be appreciated that the individualized configuration and management of tags in the aforementioned manner can be very time consuming, inefficient, and error prone. Furthermore, conventional mechanisms for control, monitoring, or archiving of tag-based information tend to become even less useful when attempting to aggregate such information across multiple systems such as in the context of other plant production systems and applications.

Non-point data may take many forms, including but not limited to, attribute information, parameters, limits and other descriptive information. Certain non-point data may be associated with the point data to provide context thereto. As used herein, the terms point data and non-point data encompass various categories of information that are not necessarily constrained to the examples described herein.

Other types of non-point data may include information such as maintenance work orders (relational data or API (Application Programming Interface) structure data from maintenance systems), equipment documentation (unstructured data usually contained within operating system files and documents), and information such as URL (Uniform Resource Locator) links to supplier web sites. These types of non-point data may be associated with non-tag based information contained, for example, within Oracle™ or SAP™ databases/environments. Non-point data therefore represents a broad class of information that may be associated with point data providing a contextual and informational basis.

Figure 4:
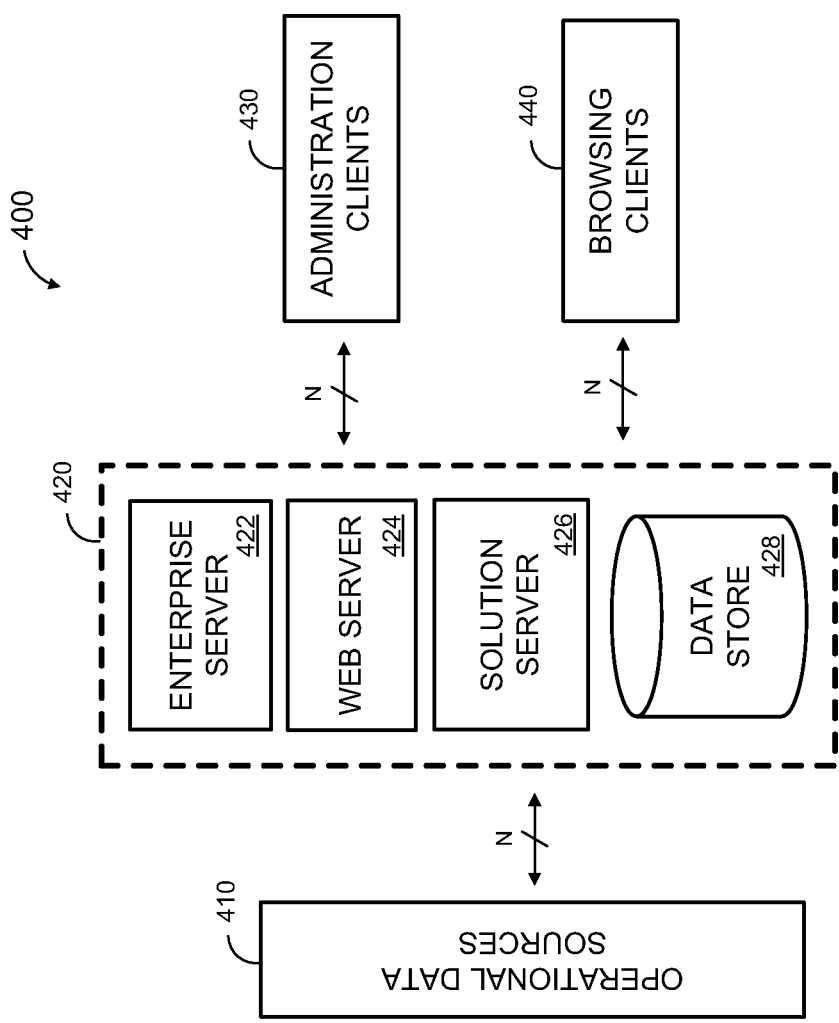
FIG. 4 is a block diagram of a system architecture according to some embodiments.

FIG. 4 illustrates an architecture of system 400 according to some embodiments. It should be noted that other architectures may be used in conjunction with other embodiments. System 400 includes operational data sources 410 in communication with application environment 420. Also in communication with application environment 420 are administration clients 430 and browsing clients 440.

Operational data sources 410 comprise various data sources, including but not limited to plant floor production systems, enterprise resource planning data systems, and other data systems. Operational data sources 410 may support one or more proprietary interfaces for accessing the data stored therein. An example of such an interface according to some embodiments is an SAP® BAPI® interface. Operational data sources 410 may also provide one or more non-proprietary mechanism for accessing stored data. The stored data may represent any type of operation, including but not limited to continuous industrial processes employed in the oil, gas, and/or chemical industries. Operational data sources 410 may include one or more of back-end data sources 140, 250 and 260 described above according to some embodiments.

Application environment 420 may store and manage a component model such as component model 300. Application environment 420 may transmit queries for data to operational data sources 410. In response, operational data sources 410 acquire and transmit the data to application environment 420. An example of this operation according to some embodiments will be described below with respect to FIG. 7.

Application environment 420 may comprise enterprise server 422, Web server 424, solution server 426, and data store 428. Application environment 420 may comprise a single server device or multiple devices. In various embodiments, enterprise server 422 and solution server 426 comprise application programs developed in Java and/or C++ language and running under Windows XP/NT/2000/2003 operating systems.

Web server 424 manages data communication between application environment 420, administration clients 430, and browsing clients 440. One or more administration clients 430 and browsing clients 440 may execute one or more Java applets to interact with Java servlets of Web server 424 according to some embodiments.

Solution server 426 is used to access data from operational data sources 410. In some embodiments, solution server 426 includes connection groups and connection processes. A connection group includes one or more object instances, each of which is associated with a particular data source of operational data sources 410. Different connection groups are associated with different data sources.

A connection process comprises processor-executable process steps to retrieve data from a particular type of data source (e.g., an SAP R/3™ server). A connection process may comply with standard or proprietary protocols, including but not limited to Oracle Database Connectivity (ODBC), Java Database Connectivity (JDBC), Object Linking and Embedding for Process Control (OPC), and Web Services. Process steps to retrieve data from a particular type of data source may be provided in a library by an owner of a proprietary interface for accessing the particular type of data source.

Accordingly, several different connection groups may use a same connection process to access their respective data sources. Moreover, each object instance may include scripts (e.g., Structured Query Language scripts) to populate itself based on retrieved data. Solution server 426 manages the objects, connection groups and connection processes to access data that is acquired and stored by disparate systems of operational data sources 410.

Solution server 426 may transmit the data acquired from operational data sources 410 to data store 428 for storage according to some embodiments. Data store 428 may store any data used during the operation of application environment 420. Data may be stored in data store 428 according to any currently- or hereafter-known protocol for storing data, including but not limited to a class-based component and view model. In this regard, data store 428 may store data in the form of objects instantiated based on components of component model 300.

Data store 428 may comprise a front-end application that is usable to access and/or manage the data stored therein. Such a front-end application may support Structured Query Language commands or the like. According to some embodiments, data store 428 may receive data directly from operational data sources 410. Data store 428 may embody one or more of back-end data sources 140, 250 and 260 according to some embodiments.

Administration clients 430 may provide user interfaces to perform administration functions for operating system 400. For example, an administrator may manipulate a user interface displayed by one of administration clients 430 to create a configuration and/or develop a view part such as those described above. Information input to the user interfaces may be received by Web server 424 and transmitted to data store 428. Examples of administration clients 430 according to some embodiments include but are not limited to a desktop computer, a laptop computer, a computer terminal, a personal digital assistant, a telephone, and a tablet computer.

Browsing clients 440 may request views of data contained in data store 428 and/or in operational data sources 410. Browsing clients 440 may also access an application of application server 420 to facilitate development of view parts and association of configurations therewith. Browsing clients 440 may provide any suitable client application such as a Web browser or a Java applet. As such, a browsing client 440 may be connected to application environment 420 through the Internet or through an Intranet. Browsing clients 440 may comprise any suitable user devices, including but not limited to those mentioned above with respect to administration clients 430.

In some embodiments, the elements of FIG. 4 are connected differently than as shown, and each block shown is implemented by one or more hardware and software elements. The hardware and software elements of one or more blocks may be located remotely from each other. Some embodiments may include environments, systems, servers, and clients that are different from those shown.

Figure 5:
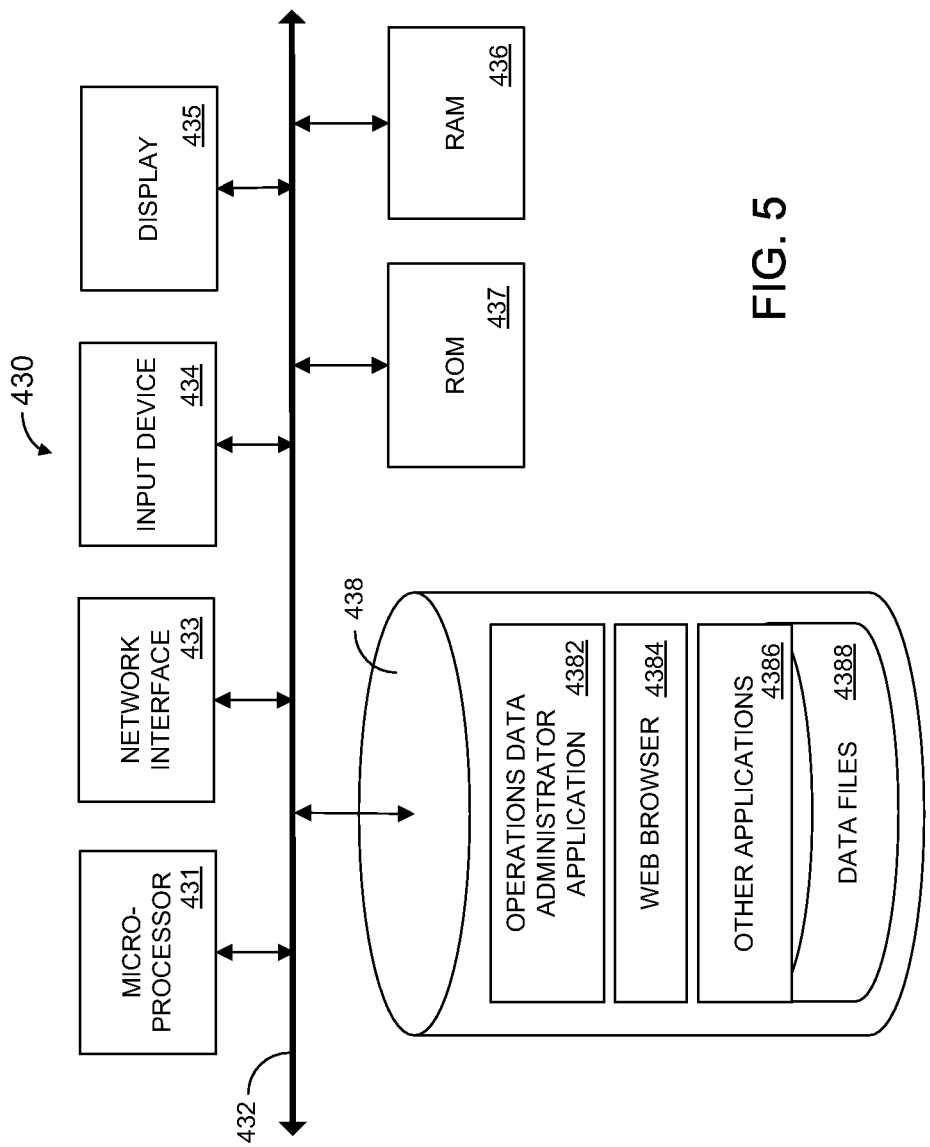
FIG. 5 is a block diagram illustrating an internal architecture of an administration client according to some embodiments.

FIG. 5 is a block diagram of an internal architecture of administration client 430 according to some embodiments. Administration client 430 may operate to create configurations associated with respective model components. Each of such configurations may indicate a data source, a data source interface, input parameters, and a mapping of returned fields to component members.

Administration client 430 includes microprocessor 431 in communication with communication bus 432. Microprocessor 431 may comprise an Intel microprocessor or other type of processor and is used to execute processor-executable process steps so as to control the elements of administration client 430 to provide desired functionality.

Also in communication with communication bus 432 is network interface 433. Network interface 433 is used to transmit data to and to receive data from devices external to administration client 430 such as a device housing Web server 424. Network interface 433 is therefore preferably configured with hardware suitable to physically interface with desired external devices and/or network connections. For example, network interface 433 may comprise an Ethernet connection to a local area network through which administration device 430 may receive and transmit information over the Web.

Input device 434 and display 435 are also in communication with communication bus 432. Any known input device may comprise input device 434, including a keyboard, mouse, touch pad, voice-recognition system, or any combination of these devices. Of course, information may also be input to administration device 430 via network interface 433. Display 435 may be an integral or separate CRT display, flat-panel display or the like used to present graphics and text in response to commands issued by microprocessor 431.

According to some embodiments, display 435 displays user interfaces that may be manipulated by an administrator using input device 434 to create a configuration associated with a model component or other data structure. An example of such a user interface is described below.

RAM 436 is connected to communication bus 432 to provide microprocessor 431 with fast data storage and retrieval. In this regard, processor-executable process steps being executed by microprocessor 431 are typically stored temporarily in RAM 436 and executed therefrom by microprocessor 431. ROM 437, in contrast, provides storage from which data can be retrieved but to which data cannot be stored. Accordingly, ROM 437 may be used to store invariant process steps and other data, such as basic input/output instructions and data used during boot-up of administration device 430 or to control network interface 433. One or both of RAM 436 and ROM 437 may communicate directly with microprocessor 431 instead of over communication bus 432.

Data storage device 438 stores, among other data, processor-executable program code of operations data administrator application 4382. Administration device 430 may execute operations data administrator application 4382 to provide the functions attributed herein to administrator client 430. Operations data administrator application 4382 may comprise a Java applet or a standalone application suitable for the operating system of administration device 4382.

Web browser 4384 may comprise processor-executable program code of a Web client. As such, administration client 430 may execute process steps of Web browser 4384 to request and receive Web pages from a Web server such as Web server 424. A Java applet such as operations data administrator application 4382 may execute within an execution engine provided by Web browser 4384.

Data storage device 438 also includes processor-executable process steps of other applications 4386. Other applications 4386 may include process steps to perform calendaring, e-mail functions, word processing, accounting, presentation development and the like. Data storage device 438 may also store process steps of an operating system (unshown). An operating system provides a platform for executing applications, device drivers and other process steps that interact with elements of administration client 430. Data files 4388 may include any electronic files usable by any application of administration client 430.

Figure 6:
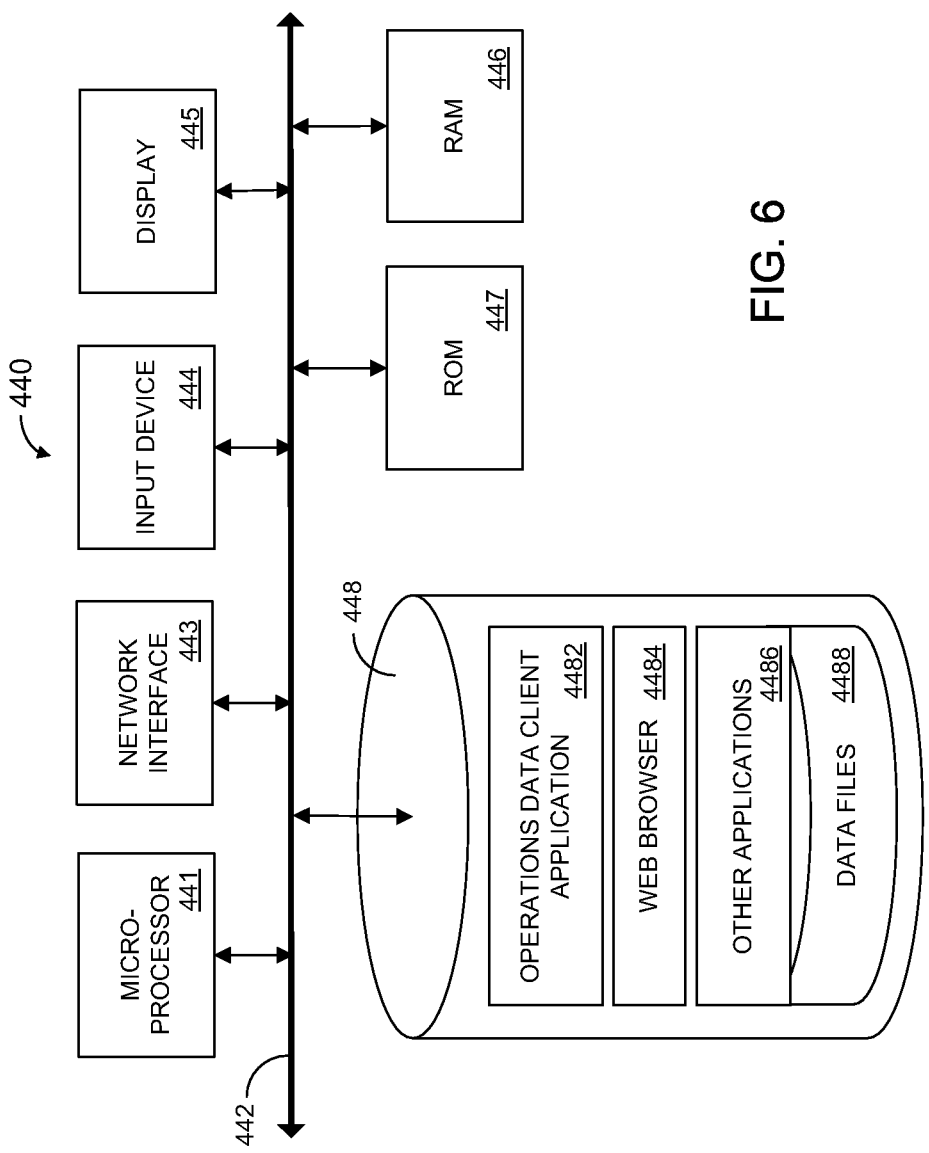
FIG. 6 is a block diagram illustrating an internal architecture of a browsing client according to some embodiments.

FIG. 6 is a block diagram of an internal architecture of browsing client 440 according to some embodiments. The illustrated elements of browsing client 440 may be implemented as described above with respect to similarly-named elements of administration client 440. Of course, the elements of browsing client 440 may operate to provide the functionality attributed herein to browsing client 440. For example, browsing client 440 may operate to create views, view parts and widgets, to receive filter criteria from a user, to request a view from application environment 420, to receive the view populated with the data from application environment 420, and to present the data to user.

Data storage device 4480 of browsing client 440 stores, among other data, processor-executable process steps of operations data client application 4482. Operations data client application 4482 may comprise a Java applet or a standalone application suitable execution by the operating system of browsing client 440.

Web browser 4484 may comprise processor-executable process steps of a Web client. As such, browsing client 440 may execute process steps of Web browser 4484 to request and receive Web pages from a Web server such as Web server 424. A Java applet such as operations data client application 4482 may execute within an execution engine provided by Web browser 4484.

The process steps stored in data storage devices 438 and 448 may be read from one or more of a computer-readable medium, such as a floppy disk, a CD-ROM, a DVD-ROM, a Zip™ disk, a magnetic tape, or a signal encoding the process steps, and then stored in data storage devices 438 and 448 in a compressed, uncompiled and/or encrypted format. In alternative embodiments, hard-wired circuitry may be used in place of, or in combination with, processor-executable process steps for implementation of processes according to some embodiments. Thus, embodiments are not limited to any specific combination of hardware and software.

Figure 7:
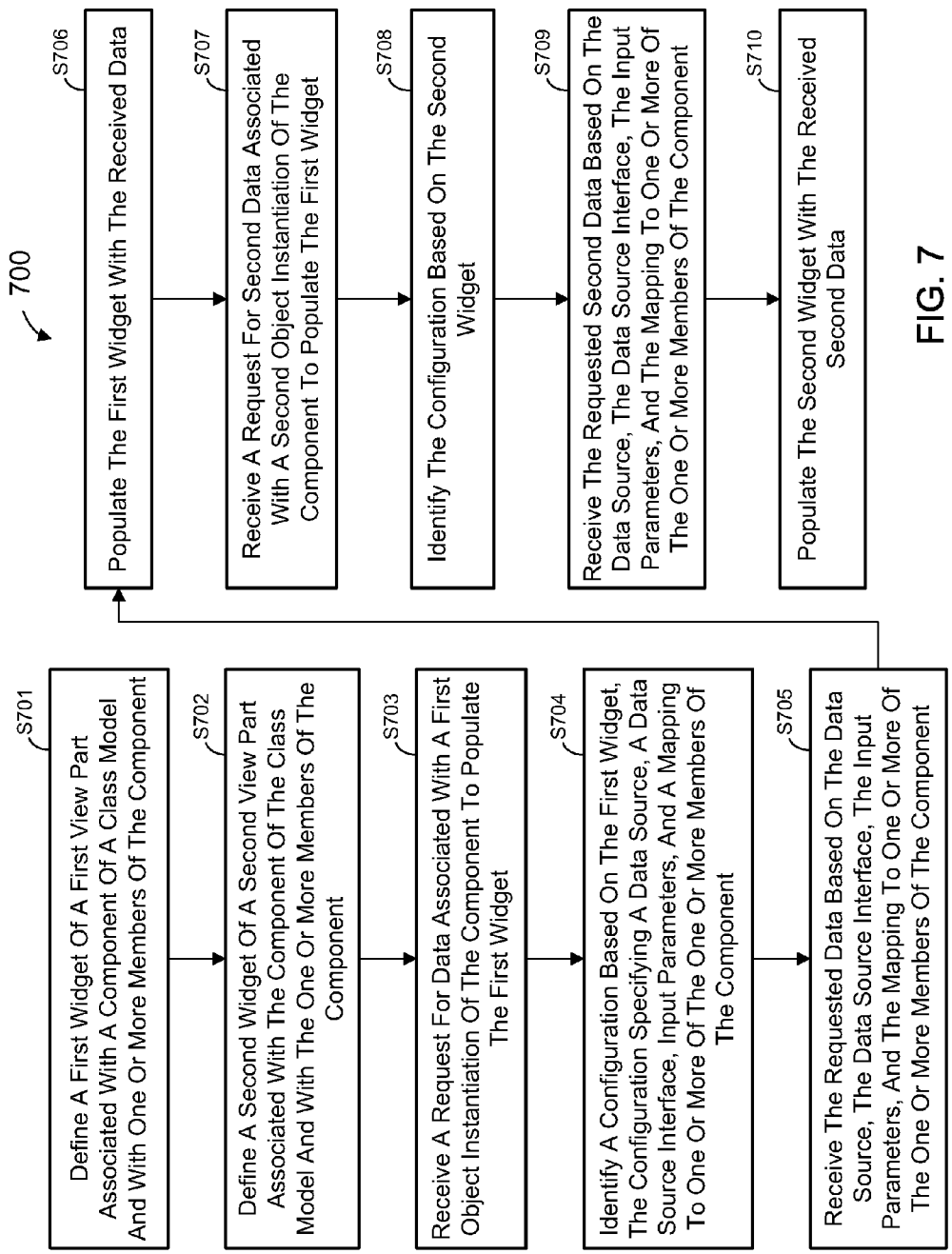
FIG. 7 illustrates a flow diagram of process steps according to some embodiments.

FIG. 7 illustrates process 700 for describing operation of a system according to some embodiments. Process 700 may be embodied in one or more software or hardware elements and executed, in whole or in part, by any device or by any number of devices in combination. Moreover, some or all of process 700 may be performed manually.

Process 700 and all other process steps mentioned herein may be embodied in processor-executable process steps read from one or more of a computer-readable medium, such as a floppy disk, a CD-ROM, a DVD-ROM, a Zip™ disk, a magnetic tape, or a signal encoding the process steps, and then stored in a compressed, uncompiled and/or encrypted format. In alternative embodiments, hard-wired circuitry may be used in place of, or in combination with, processor-executable process steps for implementation of processes according to some embodiments. Thus, embodiments are not limited to any specific combination of hardware and software.

Initially, at step S701, a first widget of a first view part is defined. The widget is associated with a component of a class model and with one or more members of the component. According to some embodiments of S701, a user operates browsing client 440 to execute operations data client application 4482. Data client application 4482 then provides a user interface which allows the user to define the first widget.

Figure 8:
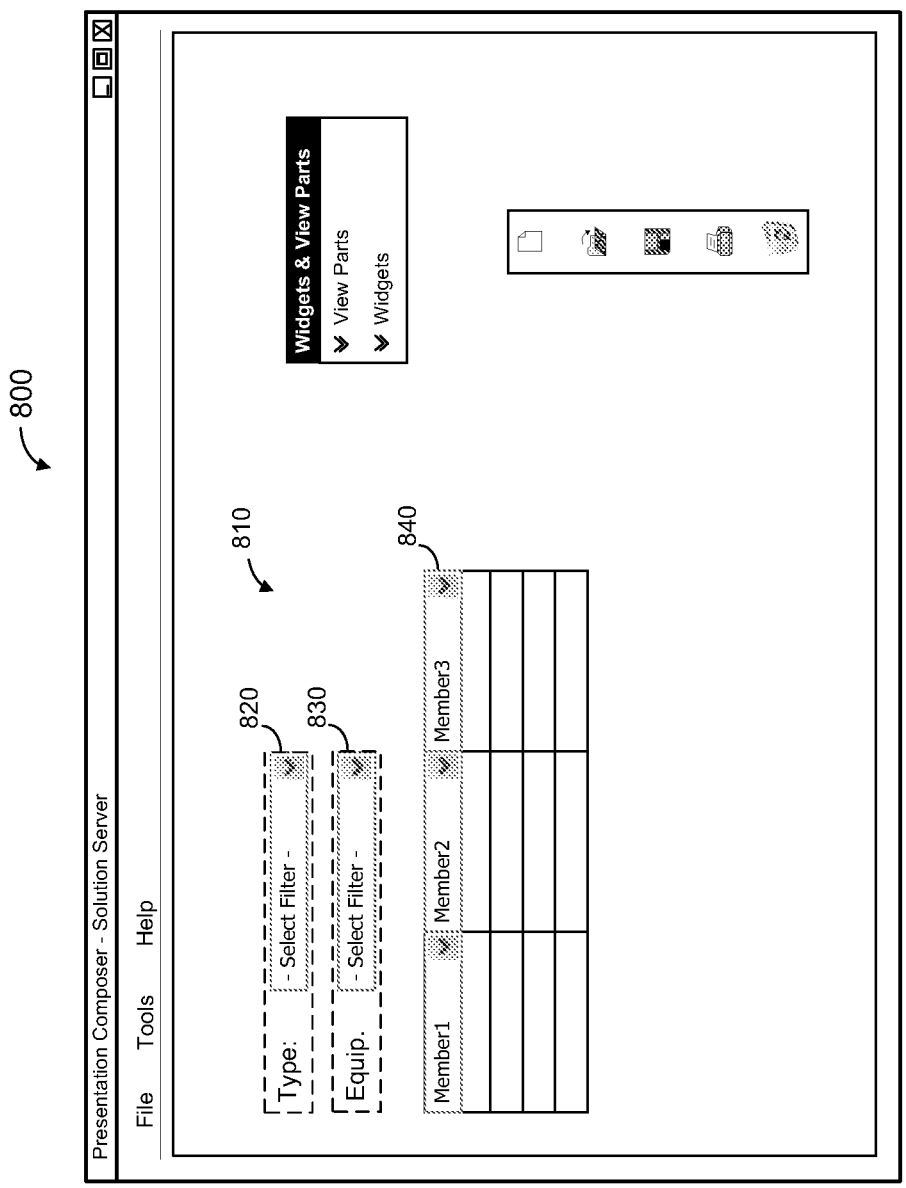
FIG. 8 is an outward view of a user interface to define a view part according to some embodiments.

FIG. 8 is an outward view of user interface 800 that may be used in conjunction with some embodiments of step S701. User interface 800 may be presented to a user on display 445 of browsing client 440. In some embodiments, browsing client 440 executes Web browser 4484 to request user interface 800 from Web server 424 of application environment 420.

User interface 800 shows view part 810 including widgets 820 through 840. Any suitable system may be employed at S701 to associate widgets 820 through 840 with a component. For example, the component may be selected from a hierarchical tree such as component model 300 of FIG. 3. Moreover, the pull-down menus of widget 830 may be used to select a member of the component for each column. As a result, widget 830 is associated with the selected members of the component.

A second widget of a second view part is defined at S702. The second widget is associated with the same component and component members that are associated with the first widget. The second widget may be defined as described above with respect to the first widget, or in a different manner. For example, the second widget may be defined by a different user than the user who defined the first widget. According to some embodiments, the first widget and the second widget are represented by widget 214 and 212 of FIG. 2, respectively.

A request for data to populate the first widget is received at S703. The requested data is associated with a first object instantiation of the component with which the first widget is associated. S703 may therefore occur upon user selection of the first view part defined at S701.

Figure 9:
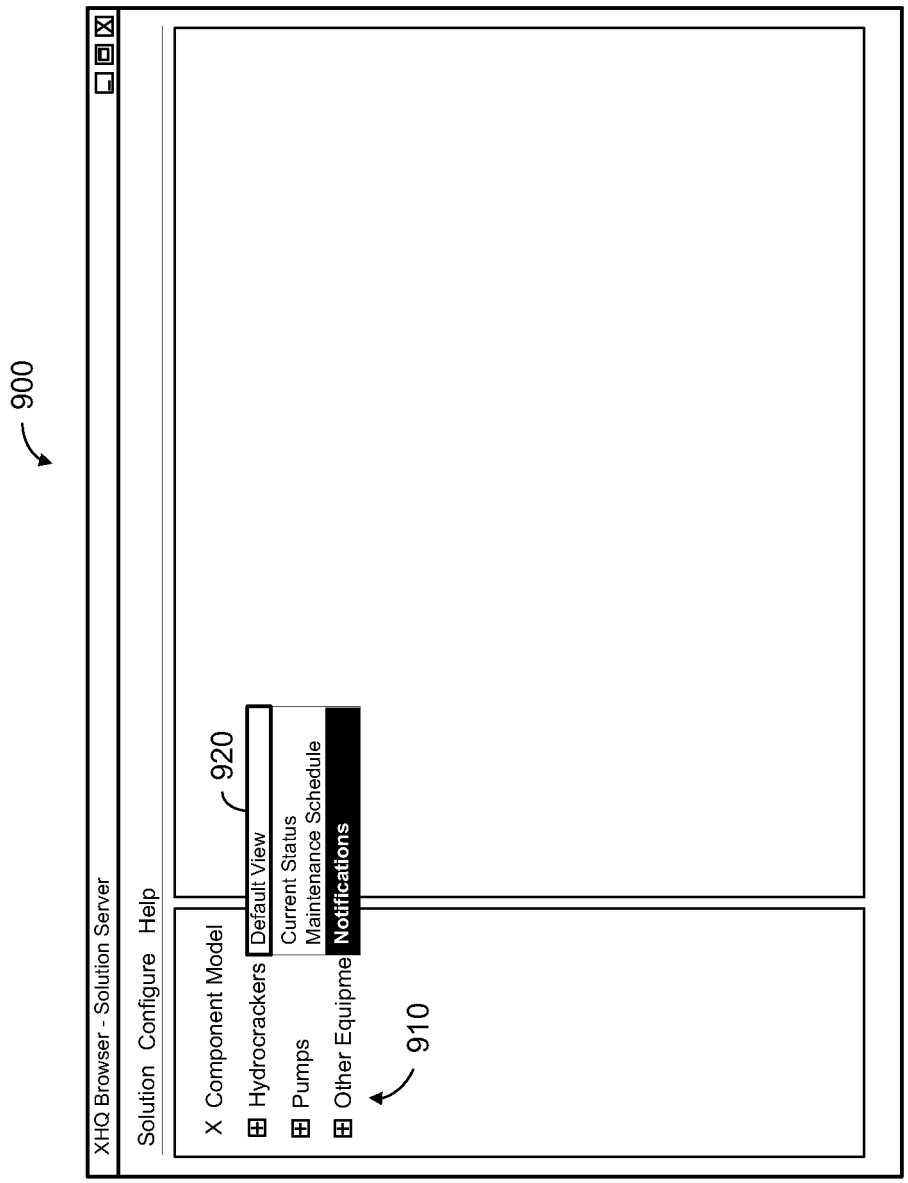
FIG. 9 is an outward view of a user interface to invoke a view part according to some embodiments.

FIG. 9 is an outward view of interface 900 that may be used to invoke the first view part in some embodiments of S703. User interface 900 may be displayed by a browsing client 440 executing a dedicated application such as operations data client application 4482 or Web browser 4484. User interface 900 may present information provided by application server 420 in response to communication from operations data client application 4482 or Web browser 4484.

As shown, interface 900 shows component model 910 including several component instantiations. For purposes of the present example, it will be assumed that each displayed instantiation is an instantiation of the component "Assets". Also shown is context menu 920 which is displayed in response to right-clicking on the instantiation "Hydrocracker". Context menu 920 specifies several views, and a "notification" view is selected therefrom.

Figure 10:
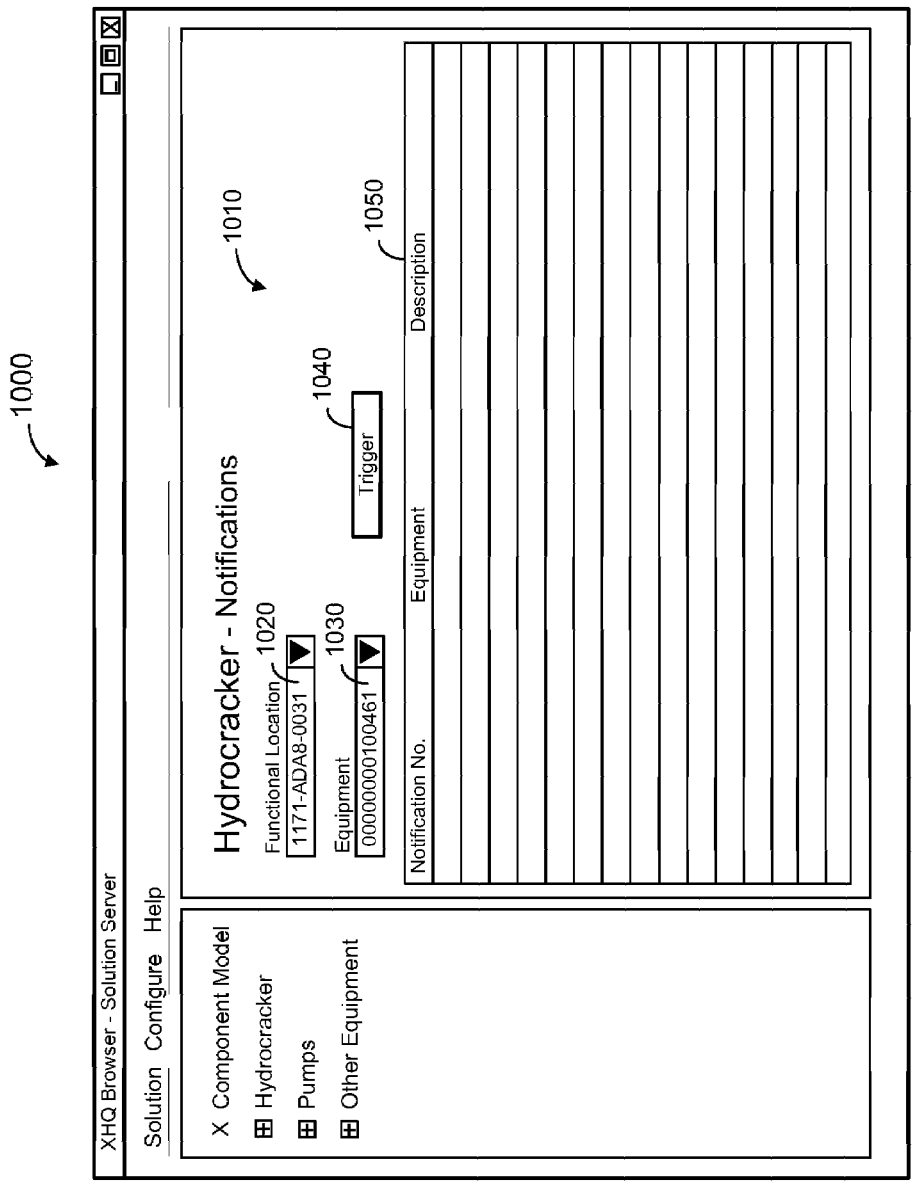
FIG. 10 is an outward view of a client interface including a view part according to some embodiments.

Interface 1000 of FIG. 10 displays the requested view. View 1010 includes field 1020 and field 1030 for receiving user criteria from the user. The user may input criteria to fields 1020 and 1030 in order to constrain the data that will be displayed in view 1010. More specifically, the user criteria input to fields 1020 and 1030 may comprise input parameters to a data source interface used to receive data of a first object instantiation of an Asset object. The data is intended to populate widget 1050.

Continuing with the example of S703, the request for the data is transmitted to application environment 420 and received thereby upon completion of fields 1020 and 1030 and user selection of Trigger button 1040.

Next, at S704, a configuration is identified based on the first widget. The configuration specifies a data source, a data source interface, input parameters, and a mapping to one or more members of the component. In a case that the first widget is widget 214 of FIG. 2, the identified configuration is configuration 232. In some embodiments, the first widget indicates an associated configuration and the identity of the configuration is received with the request at S703. According to some embodiments, the widget specifies a data source and a description of what type of data should be returned (e.g., a table, a single value, etc.). In the latter instance, a configuration is identified which is associated with the subject component and the specified data source, and which returns the specified type of data.

Figure 11:
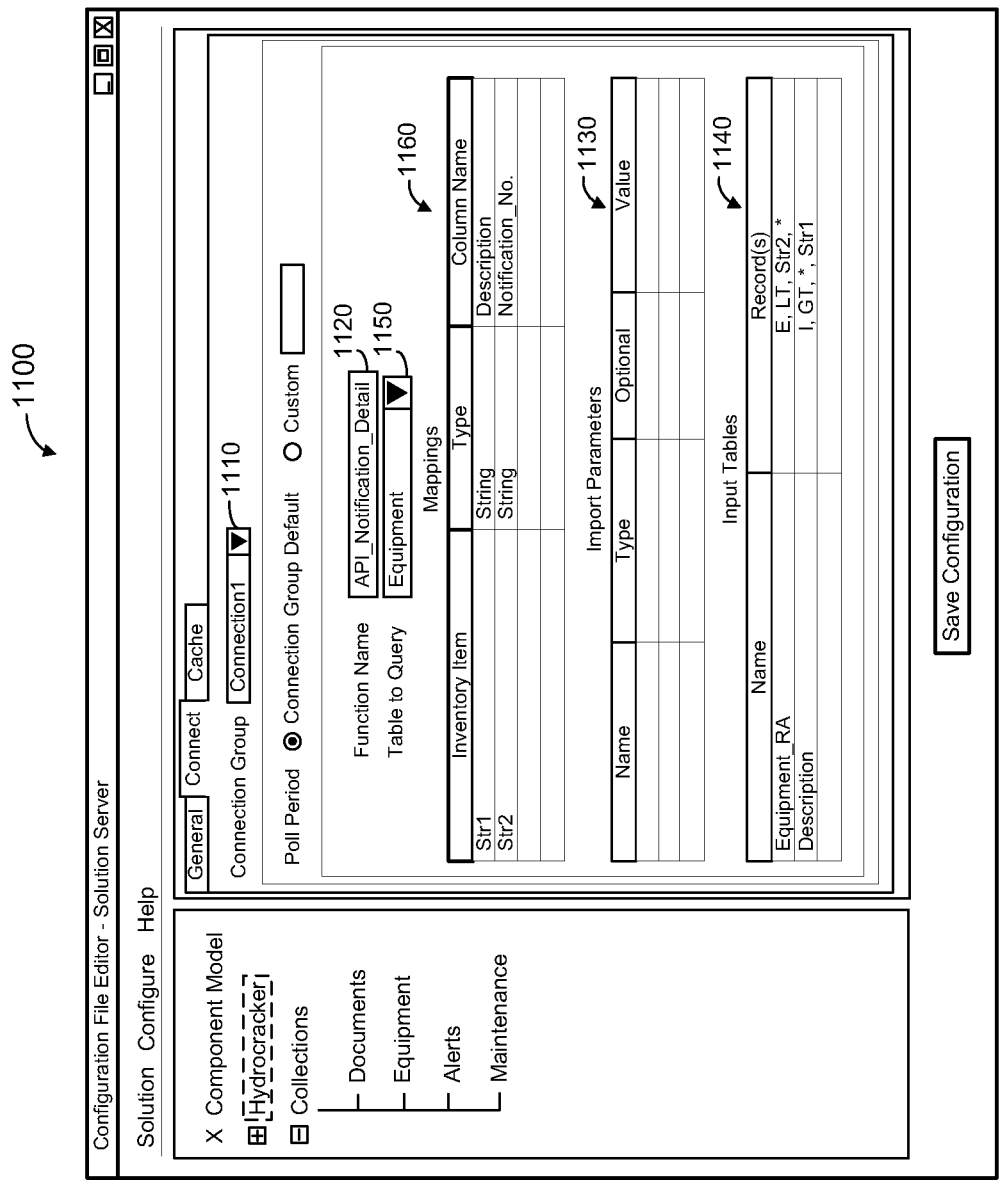
FIG. 11 is an outward view of a user interface to define a configuration according to some embodiments.

FIG. 11 is an outward view of interface 1100 according to some embodiments. Interface 1100 is presented to more clearly describe the contents of a configuration and their relation to data sources and component members according to some embodiments.

Interface 1100 may be presented to an administrator on display 435 of administration client 430. More specifically, administration client 430 may execute operations data administrator application 4382 to request access to a configuration utility served by application environment 420. In some embodiments, administration client 430 executes Web browser 4384 to request access from Web server 424 of application environment 420.

Interface 1100 includes connection group field 1110 for specifying a connection group. The connection group is associated with a data source and also with a connector process for accessing the data source. The selected data source may comprise any system for storing data. The connector process may comprise proprietary process steps usable to invoke proprietary interfaces supported by the data source. The proprietary process may be provided in a library (e.g., a Java Connector library) available to application environment 420. As described above, different connection groups are associated with different data sources, and a connection process may be associated with one or more connection groups.

A data source interface supported by the data source is shown in function name field 1120. The interface may comprise an Application Programming Interface (API) that is exposed by the selected data source and that may be invoked by application environment 420. The interface is selected in the present example by populating with a name of the interface.

Interface 1100 also shows input parameters associated with the selected data source interface. The parameters may comprise structures, class instances, values, tables, and/or any other data types used to constrain the interface. According to some embodiments, the input parameters may include input tables 1140 and/or "import parameters" 1130, which comprise a structure-like construct used to configure an SAP Business Application Interface (BAPI)® prior to invocation. In the present example, the specified interface does not require any import parameters but may require one or more input tables.

A particular data structure of the data source to query is shown in pull-down menu 1150. According to some embodiments, the selected data source interface is capable of querying a particular set of tables. These tables are listed by and selectable via pull-down menu 1150.

Table 1160 shows a mapping of one or more members of the selected component (i.e., Str1, Str2) to one or more return data fields of the data source interface. The return data fields comprise fields of each record returned by the interface.

Returning to process 700, the requested data is received based on the above-described features of the identified configuration. For example, the data source interface of the configuration is invoked using the specified input parameters (e.g., received from widgets 1020 and 1030). Data associated with the return data fields of the interface is then received from the data source.

The first widget is populated with the received data at S706. In some embodiments, application environment 420 populates the fields of the first widget representing component members with the received data based on the member/returned data field mapping of the configuration. The component may comprise a collection including several object instantiations. Browsing client 440 may therefore present the data of each member of each instantiation in appropriate rows and columns of widget 1050.

S707 through S710 of process 700 proceed as described above with respect to S703 through S706, although with respect to the second widget of the second view part. In this regard, the same configuration is identified at S708 that was identified at S704, and the same data source, data source interface, input parameters and mapping are used to receive the data and populate the second widget. The data received at S709 may differ from the data received at S705 because the values of the input parameters used in S709 may differ from the values of the input parameters used in S704.

Provided below are examples of a view part and a configuration file associated with an Asset component according to some embodiments. The view part includes information specifying widgets and the configuration file includes several configurations as described above. The examples are not intended to limit the scope of the appended claims.

---

Asset View Part

```
<?xml version="1.0" encoding="utf-8"?>
<composer>

<registrations>
  <registration Assembly="XhqRunner" Namespace="XhqThinClient" TagPrefix="runner" />
```

-continued

| Asset View Part |
|---|

```
  <registration Assembly="XhqWidgetLibrary" Namespace="XhqWidgetLibrary"
TagPrefix="xhq2" />
 </registrations>
 <implementations>
  <implementation interface="XhqThinClient.IXhqWiring" />
  <implementation interface="XhqThinClient.IXhqMetadata" />
 </implementations>
 <metadata>
  <author>
  </author>
  <version>
  </version>
  <category>View Parts</category>
  <Description>
  </Description>
  <longDescription>
  </longDescription>
 </metadata>
 <ioList>
 </ioList>
 <wireconnections>
  <connection>
   <producer>XhqFilter2</producer>
   <output>FilterNameValue</output>
   <consumer>XhqWebGrid1</consumer>
   <input>FilterNameValue</input>
  </connection>
  <connection>
   <producer>XhqFilter1</producer>
   <output>FilterNameValue</output>
   <consumer>XhqWebGrid1</consumer>
   <input>FilterNameValue</input>
  </connection>
 </wireconnections>
 <propertyList>
  <property NAME="EquipFilterSrc" TYPE="String" PROPERTY="XhqFilter1.DataSourceName"
DEFAULT_VALUE="DataSource1" />
  <property NAME="GridSrc" TYPE="String" PROPERTY="XhqWebGrid1.DataSourceName"
DEFAULT_VALUE="DataSource1" />
  <property NAME="TypeFilterSrc" TYPE="String" PROPERTY="XhqFilter2.DataSourceName"
DEFAULT_VALUE="DataSource1" />
 </propertyList>
  <controlList HEIGHT="292" WIDTH="402">
   <control ID="XhqFilter1" X="0" Y="45" HEIGHT="30" WIDTH="233" TYPE="XhqFilter"
TagPrefix="xhq2">
    <properties>
     <property NAME="DataSourceName" TYPE="String" VALUE="DataSource1"
DEFAULT_VALUE="DataSource1" />
     <property NAME="Prompt" TYPE="String" VALUE="Equip." DEFAULT_VALUE="Filter" />
    </properties>
   </control>
   <control ID="XhqWebGrid1" X="0" Y="90" HEIGHT="202" WIDTH="402" TYPE="XhqWebGrid"
TagPrefix="xhq2">
    <properties>
     <property NAME="W" TYPE="Unit" VALUE="400" DEFAULT_VALUE="400" />
     <property NAME="DataSourceName" TYPE="String" VALUE="DataSource1"
DEFAULT_VALUE="DataSource1" />
     <property NAME="H" TYPE="Unit" VALUE="200" DEFAULT_VALUE="200" />
    </properties>
   </control>
   <control ID="XhqFilter2" X="0" Y="0" HEIGHT="30" WIDTH="233" TYPE="XhqFilter"
TagPrefix="xhq2">
    <properties>
     <property NAME="DataSourceName" TYPE="String" VALUE="DataSource1"
DEFAULT_VALUE="DataSource1" />
     <property NAME="Prompt" TYPE="String" VALUE="Type" DEFAULT_VALUE="Filter" />
    </properties>
   </control>
  </controlList>
</composer>
```

| Asset Configuration File |
|---|

```xml
<?xml version="1.0" encoding="utf-8" ?>
<xhq>
 <dataSource NAME="xhqApiCommon" ABSTRACT="true" >
  <property NAME="DataSourceType" VALUE="XHQ_API" />
  <property NAME="ServerName" VALUE="localhost" />
 </dataSource>
 <dataSource NAME="xhqApiTable1" ABSTRACT="true" >
  <parent NAME="xhqApiCommon" />
  <property NAME="GlobalCollectionPath" VALUE="::Assets" />
 </dataSource>
 <dataSource NAME="xhqApiTable2" ABSTRACT="true" >
  <parent NAME="xhqApiCommon" />
  <property NAME="GlobalCollectionPath" VALUE="::FMEnvMonitoringStation" />
 </dataSource>
 <dataSource NAME="DataSourceAssets" >
  <parent NAME="xhqApiTable1" />
  <property NAME="KeyColumn" VALUE="Equipment" />
  <property NAME="OnClickSend" VALUE="Equipment" />
  <property NAME="ColumnNames" VALUE="Equipment,Description,EquipmentType,Status,Area" />
  <property NAME="DisplayColumnNames" VALUE="Equipment,Description,Type,Status," />
  <property NAME="WhereClause" VALUE="Area = 'DISTILLATION' {0}" />
  <property NAME="OrderByClause" VALUE="Equipment ASC" />
 </dataSource>
 <dataSource NAME="FilterWidget1" >
  <parent NAME="xhqApiTable1" />
  <property NAME="ColumnNames" VALUE="Equipment" />
  <property NAME="DistinctColumn" VALUE="Equipment" />
  <property NAME="PostSort" VALUE="Equipment ASC" />
  <property NAME="WhereClause" VALUE="Area = 'DISTILLATION'" />
 </dataSource>
 <dataSource NAME="FilterWidget2" >
  <parent NAME="xhqApiTable1" />
  <property NAME="ColumnNames" VALUE="EquipmentType" />
  <property NAME="DistinctColumn" VALUE="EquipmentType" />
  <property NAME="PostSort" VALUE="EquipmentType ASC" />
  <property NAME="WhereClause" VALUE="Area = 'DISTILLATION'" />
 </dataSource>
 <dataSource NAME="FilterWidget3" >
  <parent NAME="xhqApiTable1" />
  <property NAME="ColumnNames" VALUE="Description" />
  <property NAME="DistinctColumn" VALUE="Description" />
  <property NAME="PostSort" VALUE="Description ASC" />
  <property NAME="WhereClause" VALUE="Area = 'DISTILLATION'" />
 </dataSource>
 <dataSource NAME="FilterWidget4" >
  <parent NAME="xhqApiTable1" />
  <property NAME="ColumnNames" VALUE="Status" />
  <property NAME="DistinctColumn" VALUE="Status" />
  <property NAME="PostSort" VALUE="Status ASC" />
  <property NAME="WhereClause" VALUE="Area = 'DISTILLATION'" />
 </dataSource>
 <dataSource NAME="DataSourceTS" >
  <parent NAME="xhqApiCommon" />
  <property NAME="BasePath" VALUE="::ELSRefinery.Tags" />
  <property NAME="MemberPath" VALUE="{0}" />
  <property NAME="TimeSeriesT1" VALUE="now-2:00:00" />
  <property NAME="TimeSeriesT2" VALUE="now" />
  <property NAME="PointCount" VALUE="100" />
  <property NAME="TimeSeriesMode" VALUE="Timesliced_Interpolate" />
 </dataSource>
 <dataSource NAME="DataSourceTSActuals" >
  <parent NAME="xhqApiCommon" />
  <property NAME="BasePath" VALUE="::ELSRefinery.Tags" />
  <property NAME="MemberPath" VALUE="::ELSRefinery.Tags.Duty" />
  <property NAME="TimeSeriesT1" VALUE="now-1:00:00" />
  <property NAME="TimeSeriesT2" VALUE="now" />
  <property NAME="PointCount" VALUE="100" />
  <property NAME="TimeSeriesMode" VALUE="Actuals" />
 </dataSource>
 <dataSource NAME="DataSourceENV" >
   <parent NAME="xhqApiTable2" />
   <property NAME="KeyColumn" VALUE="sName" />
   <property NAME="OnClickSend" VALUE="sName" />
   <property NAME="ColumnNames" VALUE="rH2SConc,rSO2Conc" />
   <property NAME="DisplayColumnNames" VALUE="rH2SConc,rSO2Conc" />
 </dataSource>
 <dataSource NAME="DataSourceENV1" >
```

-continued

Asset Configuration File

```
    <parent NAME="xhqApiTable2" />
    <property NAME="KeyColumn" VALUE="sName" />
    <property NAME="OnClickSend" VALUE="sName" />
    <property NAME="ColumnNames"
VALUE="rH2SConc,rSO2Conc,rTemperature,rWindDirection,rWindSpeed,rXCoord,rYCoord,
sH2SUnit,sName,sSO2Unit,sTemperatureUnit,sWindSpeedUnit" />
    <property NAME="DisplayColumnNames"
VALUE="rH2SConc,rSO2Conc,rTemperature,rWindDirection,rWindSpeed,rXCoord,rYCoord,
sH2SUnit,sName,sSO2Unit,sTemperatureUnit,sWindSpeedUnit" />
  </dataSource>
  <dataSource NAME="DataSourceChart" >
    <parent NAME="xhqApiCommon" />
    <property NAME="GlobalCollectionPath" VALUE="::FMEnvMonitoringStation" />
    <property NAME="ColumnNames" VALUE="sName,rTemperature" />
    <property NAME="WhereClause" VALUE="{0}" />
    <property NAME="OrderByClause" VALUE="sName ASC" />
  </dataSource>
</xhq>
```

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
defining a first widget of a first view part associated with a component of a class model and with one or more members of the component;
defining a second widget of a second view part associated with the component of the class model and with the one or more members of the component;
providing a configuration file associated with the component, the configuration file including at least one configuration specifying a data source, a data source interface, input parameters, and a mapping to one or more of the one or more members of the component, accessible by multiple widgets in multiple different view parts for populating the widget with regard to the component with two widgets of different view parts, enabled to access the same configuration of the configuration file to retrieve data for the different view parts, as specified by the configuration, even when the data required by each view part may be different;
receiving a request for data associated with a first object instantiation of the component to populate the first widget;
identifying a configuration based on the first widget;
receiving the requested data based on the data source, the data source interface, the input parameters, and the mapping to one or more of the one or more members of the component specified by the configuration;
populating the first widget with the received data;
receiving a request for second data associated with a second object instantiation of the component to populate the second widget;
identifying the configuration based on the second widget;
receiving the requested second data based on the data source, the data source interface, the input parameters, and the mapping to one or more of the one or more members of the component specified by the configuration; and
populating the second widget with the second received data.

2. The method according to claim 1, further comprising:
defining a third widget of the first view part associated with the component of the class model and with the one or more members of the component; receiving a request for third data associated with a third object instantiation of the component to populate the third widget; identifying the configuration based on the third widget; receiving the requested third data based on the data source, the data source interface, the input parameters, and the mapping to one or more of the one or more members of the component; and populating the third widget with the received third data; one or more of the foregoing steps being performed by a processor device executing processor-executable process steps.

3. The method according to claim 1, further comprising:
defining a third widget of the first view part associated with the component of the class model and with a second one or more members of the component; receiving a request for third data associated with a third object instantiation of the component to populate the third widget; identifying a second configuration based on the third widget, the second configuration specifying a second data source, a second data source interface, second input parameters, and a second mapping to one or more of the second one or more members of the component; receiving the requested third data based on the second data source, the second data source interface, the second input parameters, and the second mapping; and populating the third widget with the received third data.

4. The method according to claim 3, further comprising:
defining a fourth widget of the first view part associated with the component of the class model and with the one or more members of the component; receiving a request for fourth data associated with a fourth object instantiation of the component to populate the fourth widget; identifying the configuration based on the fourth widget; receiving the requested fourth data based on the data source, the data source interface, the input parameters, and the mapping to one or more of the one or more members of the component; and populating the fourth widget with the received fourth data.

5. The method according to claim 3, further comprising: defining a fourth widget of the second view part associated with the component of the class model and with the second one or more members of the component; receiving a request for fourth data associated with a fourth object instantiation of the component to populate the fourth widget; identifying the second configuration based on the fourth widget; receiving the requested fourth data based on the second data source, the second data source interface, the second input parameters, and the second mapping; and populating the fourth widget with the received fourth data.

6. The method according to claim 1, further comprising: defining a third widget of the first view part associated with the component of the class model and with a second one or more members of the component; receiving a request for third data associated with a third object instantiation of the component to populate the third widget; identifying a second configuration based on the third widget, the second configuration specifying the data source, a second data source interface, second input parameters, and a second mapping to one or more of the second one or more members of the component; receiving the requested third data based on the data source, the second data source interface, the second input parameters, and the second mapping; and populating the third widget with the received third data.

7. The method according to claim 6, further comprising: defining a fourth widget of the second view part associated with the component of the class model and with a second one or more members of the component; receiving a request for fourth data associated with a fourth object instantiation of the component to populate the fourth widget; identifying the second configuration based on the fourth widget; receiving the requested fourth data based on the data source, the second data source interface, the second input parameters, and the second mapping; and populating the fourth widget with the received fourth data.

8. The method according to claim 1, wherein the class model represents tag-based data and non-tag-based data.

9. The method according to claim 8, wherein the tag-based data and non-tag-based data are derived from a continuous industrial process.

10. The method according to claim 9, wherein the industrial process comprises operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

11. A non-transitory medium storing computer-executable program code, the program code comprising:
  code to define a first widget of a first view part associated with a component of a class model and with one or more members of the component;
  code to define a second widget of a second view part associated with the component of the class model and with the one or more members of the component;
  code to define a configuration file associated with the component, the configuration file including at least one configuration specifying a data source, a data source interface, input parameters, and a mapping to one or more of the one or more members of the component; accessible by multiple widgets in multiple different view parts for populating the widget with regard to the component with two widgets of different view parts, enabled to access the same configuration of the configuration file to retrieve data for the different view parts, as specified by the configuration, even when the data required by each view part may be different;
  code to receive a request for data associated with a first object instantiation of the component to populate the first widget;
  code to identify a configuration based on the first widget
  code to receive the requested data based on the data source, the data source interface, the input parameters, and the mapping to one or more of the one or more members of the component specified by the configuration;
  code to populate the first widget with the received data;
  code to receive a request for second data associated with a second object instantiation of the component to populate the second widget;
  code to identify the configuration based on the second widget;
  code to receive the requested second data based on the data source, the data source interface, the input parameters, and the mapping to one or more of the one or more members of the component specified by the configuration; and
  code to populate the second widget with the second received data.

12. The medium according to claim 11, the program code further comprising:
  code to define a third widget of the first view part associated with the component of the class model and with the one or more members of the component; code to receive a request for third data associated with a third object instantiation of the component to populate the third widget; code to identify the configuration based on the third widget; code to receive the requested third data based on the data source, the data source interface, the input parameters, and the mapping to one or more of the one or more members of the component; and code to populate the third widget with the received third data.

13. The medium according to claim 11, the program code further comprising:
  code to define a third widget of the first view part associated with the component of the class model and with a second one or more members of the component; code to receive a request for third data associated with a third object instantiation of the component to populate the third widget; code to identify a second configuration based on the third widget, the second configuration specifying a second data source, a second data source interface, second input parameters, and a second mapping to one or more of the second one or more members of the component; code to receive the requested third data based on the second data source, the second data source interface, the second input parameters, and the second mapping; and code to populate the third widget with the received third data.

14. The medium according to claim 13, the program code further comprising:
  code to define a fourth widget of the first view part associated with the component of the class model and with the one or more members of the component; code to receive a request for fourth data associated with a fourth object instantiation of the component to populate the fourth widget; code to identify the configuration based on the fourth widget; code to receive the requested fourth data based on the data source, the data source interface, the input parameters, and the mapping to one or more of the one or more members of the component; and code to populate the fourth widget with the received fourth data.

15. The medium according to claim 13, the program code further comprising:
code to define a fourth widget of the second view part associated with the component of the class model and with the second one or more members of the component; code to receive a request for fourth data associated with a fourth object instantiation of the component to populate the fourth widget; code to identify the second configuration based on the fourth widget; code to receive the requested fourth data based on the second data source, the second data source interface, the second input parameters, and the second mapping; and code to populate the fourth widget with the received fourth data.

16. The medium according to claim 11, the program code further comprising:
code to define a third widget of the first view part associated with the component of the class model and with a second one or more members of the component; code to receive a request for third data associated with a third object instantiation of the component to populate the third widget; code to identify a second configuration based on the third widget, the second configuration specifying the data source, a second data source interface, second input parameters, and a second mapping to one or more of the second one or more members of the component; code to receive the requested third data based on the data source, the second data source interface, the second input parameters, and the second mapping; and code to populate the third widget with the received third data.

17. The medium according to claim 16, the program code further comprising:
code to define a fourth widget of the second view part associated with the component of the class model and with a second one or more members of the component; code to receive a request for fourth data associated with a fourth object instantiation of the component to populate the fourth widget; code to identify the second configuration based on the fourth widget; code to receive the requested fourth data based on the data source, the second data source interface, the second input parameters, and the second mapping; and code to populate the fourth widget with the received fourth data.

18. The medium according to claim 11, wherein the class model represents tag-based data and non-tag-based data.

19. The medium according to claim 18, wherein the tag-based data and non-tag-based data are derived from a continuous industrial process.

20. The medium according to claim 19, wherein the industrial process comprises operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

* * * * *